Oct. 18, 1960 R. L. WRIGHT, JR 2,957,127
NON-ELECTRONIC ECCENTRICITY INDICATOR
Filed May 16, 1958
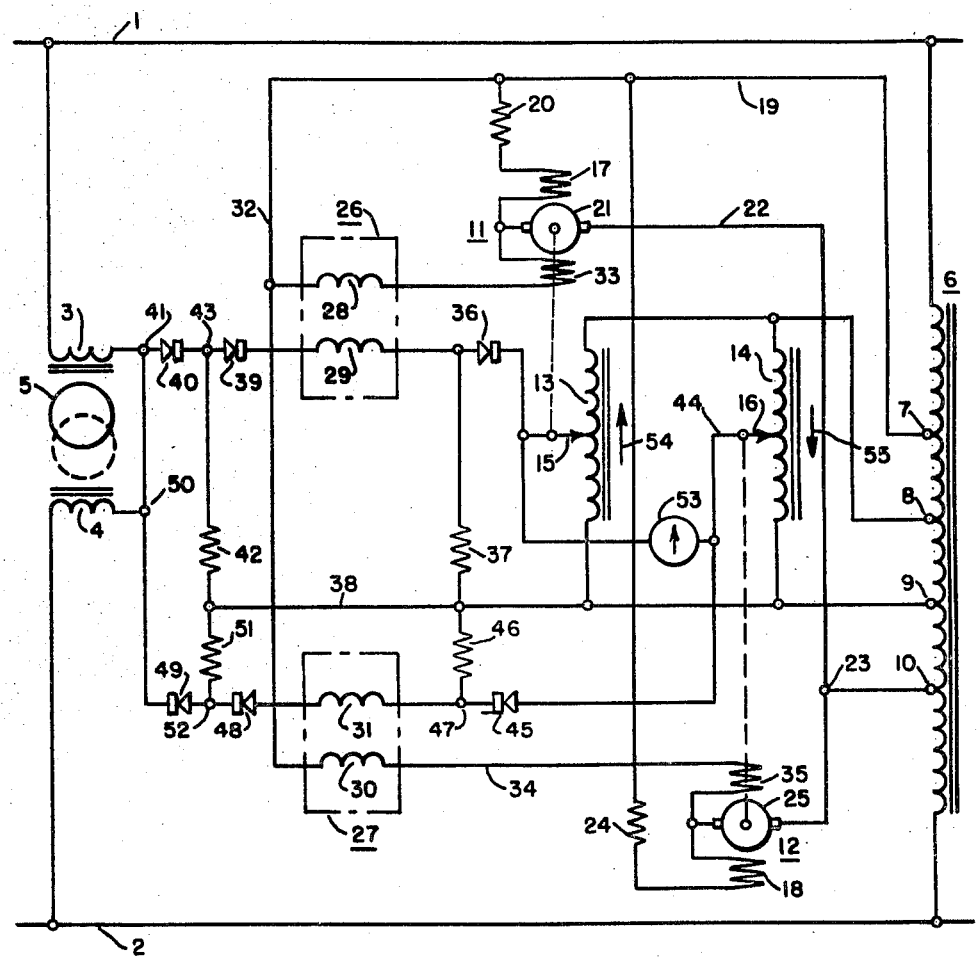
WITNESSES
Leon J. Taza
Bernard R. Gregway
INVENTOR
Robert L. Wright, Jr.
BY
George C. Thompson
ATTORNEY

2,957,127
NON-ELECTRONIC ECCENTRICITY INDICATOR

Robert L. Wright, Jr., North Linthicum, Md., assignor to Westinghouse Electric Corporation, East Pittsburgh, Pa., a corporation of Pennsylvania Filed May 16, 1958, Ser. No. 735,794

6 Claims. (Cl. 324—34)

This invention relates to a non-electronic eccentricity device and more particularly to an eccentricity device associated with a rotating machine capable of determining the amount of eccentricity of the rotating member in the machine without the use of electron devices.

In machines such as steam turbines it is necessary to detect the amount of eccentricity occurring in the shaft of the steam turbine during the initial rotating period of the turbine shaft and blades. This eccentricity occurs due to higher temperature steam being exposed to one-half of the shaft and blades than the steam associated with the other half of the shaft and blades. The result is a bending of the shaft to the extremes capable of causing damage to turbine blades if the rotation is increased. Past devices utilized for determining the amount of eccentricity in steam turbines have either involved mechanical devices which are subject to wear and somewhat cumbersome or electronic circuits depending upon vacuum tube devices for their operation. Since the mechanical devices are subject to wear and the electronic tubes are subject to rapid deterioration and failure, a new device for the purpose is needed.

It is therefore an object of this invention to provide a turbine eccentricity device capable of rapid operations without the danger of failure.

It is another object of this invention to provide a turbine eccentricity device free from electronic tubes and thus more reliable in operation.

It is another object of this invention to provide a turbine eccentricity device utilizing a simple control circuit that is inexpensive to manufacture.

Other objects, purposes and characteristic features will become obvious as the description of the invention progresses.

In practicing this invention the turbine eccentricity device utilizes pick-up coils adjacent the eccentricity shaft for the purpose of detecting any eccentricity of the shaft. The shaft output is then utilized to control magnetic amplifiers capable of controlling motor driven movable brush transformers for presenting a voltage indicative of the amount of eccentricity detected by the pick-up coils.

The figure of the drawing is a schematic view of one embodiment of this invention utilizing two motor driven movable brush transformers.

In the drawing similar parts bear like reference characters.

In this invention, a pair of conductors 1 and 2 is provided for supplying a suitable voltage to the circuit to be described with this voltage preferably being a 240 volt alternating-current source. Connected in series across the conductors 1 and 2 is a pair of pick-up coils 3 and 4 positioned on opposite sides and adjacent to a shaft 5 of any suitable machine such as a turbine, not shown. The pick-up coils 3 and 4 are positioned equidistant from the center of the shaft during periods of no eccentricity. The function of the pick-up coils 3 and 4 will be described hereinafter.

Also connected across the conductors 1 and 2 is an auto transformer 6 provided with voltage tap points 7, 8, 9 and 10. The voltage tap points 7 and 10 are separated by 120 volts in this preferred arrangement and are used for drive voltages on a pair of motors 11 and 12. The voltage tap points 8 and 9 are spaced 40 volts apart and 100 volts from each of the lines 1 and 2. The 40 volts appearing between the taps 8 and 9 are then applied to a pair of movable brush tap transformers, or impedance members 13 and 14 provided with movable taps or brushes 15 and 16 connected to the motors 11 and 12, respectively, for movement therewith.

The motors 11 and 12 are provided with reverse fields 17 and 18, respectively, for causing the motors to be slowly driven in opposite directions, for example, the brush 15 being driven slowly downwardly as viewed in the drawing and the brush 16 being driven slowly upwardly as viewed in the drawing. The energizing circuit for the motor 11 for the reverse drive can be traced from the terminal 7 through the conductor 19, the current limiting resistor 20, the field winding 17, the armature 21 of the motor 11, the conductors 22 and 23 to the terminal point 10. A series resistor 20 provides sufficient current limiting quality to limit the rotation of the armature 21 of motor 11 to a very slow movement, for example, one revolution in ten minutes.

The energizing circuit for reverse rotation of the motor 12 can be traced from the contact point 7, the conductor 19, through the resistor 24, the reverse winding 18, armature 25, and the conductors 22 and 23 to the contact point 10. The reverse winding energization of the motor 12 is sufficiently limited in current flow by the resistor 24 to cause slow rotation similar to the motor 11; that is, one revolution for every ten-minute period in the reverse direction.

The motors 11 and 12 are reversible motors and capable of being driven at a fairly high rate of speed in directions opposite to the previously described directions. For example, the motor 11 can act to drive the brush 15 of the movable brush transformer 13 operatively as viewed in the drawing at a rather high rate of speed. Similarly, the motor 12 can act in a forward direction to drive the brush 16 downwardly as viewed in the drawing at a rather high rate of speed. In order to provide this direction of rotation and high speed operation, a pair of magnetic amplifiers 26 and 27 is provided. The magnetic amplifier 26 is provided with a main winding 28 and a control winding 29. Likewise, the magnetic amplifier 27 is provided with a main winding 30 and control winding 31. If we assume that the control winding for the magnetic amplifier 26 is conditioned (by a circuit to be explained hereinafter) to allow the main winding 28 to become very low in reactance, or in other words, allow the magnetic amplifier 26 to conduct, a low resistance path is formed fom the conductor 19 through the conductor 32, the main winding 28 of the magnetic amplifier 26, the main field winding 33 of the motor 11 connected in series with the armature 21, thus resulting in a current flow path through the forward or main winding 33 of the motor 11 causing it to rotate at high speed in a direction to cause the brush 15 to move upwardly on the drawing. If the control winding 29 of the magnetic amplifier 26 affects control of the magnetic amplifier to cause non-conduction of the amplifier, the main winding 28 becomes highly reactive blocking forward drive of the motor 11. At this time the motor would return to its slow reverse drive condition.

The motor 12 is also provided with a forward drive circuit capable of being traced from the conductor 19 through the conductor 32, the main winding 30 of the magnetic amplifier 27, the conductor 34 and main field winding 35 of the motor 12 connected in series with the armature 25. Function of the magnetic amplifier 27 is identical with that of the magnetic amplifier 26 in that during conduction period determined by the control winding 31, the motor 12 is energized through its main winding 35 and is conditioned to drive the brush 16 downwardly as viewed from the drawing at a high rate of speed. If the control winding 31 of the magnetic amplifier causes a high reactance in the main winding 30 to occur, the low resistance forward drive circuit for the motor 12 would become interrupted, allowing the reverse drive winding 18 to become active in causing the brush 16 to be driven upward as viewed in the drawing at the previously stated slow pace.

The control circuit for the magnetic amplifiers 26 and 27 will now be described in detail. The control winding 29 of the magnetic amplifier 26 is connected to the brush 15 through the rectifier 36 poled to permit current flow from the brush 15 through the rectifier 36 and resistor 37 to the reference conductor 38 connected to the junction point 9 of the auto transformer 6. The junction point between the rectifier 36 and resistor 37 is then connected to one terminal of the control winding 29 of the magnetic amplifier 26, while the other terminal of the control winding 29 is connected through the rectifiers 39 and 40 to the junction point 41 located between the pick-up coils 3 and 4. The rectifiers 39 and 40 are poled to prevent current flow from the resistor 37 and rectifier 36 through the control winding 29 to the junction point 41 between the pick-up coils 3 and 4. A resistor 42 is connected between the reference conductor 38 and a junction point 43 positioned between the two rectifiers 39 and 40.

The control circuit for the control winding 31 or the magnetic amplifier 27 can also be traced from the brush 16 of the movable brush transformer 14 through the conductor 44, rectifier 45, poled to permit current flow from the reference conductor 38 through a resistor 46, through the rectifier 45 to the brush 16. One terminal of the control winding 31 is connected to junction point 47 between the resistor 46 and rectifier 45, while the other terminal of the control winding 31 is connected through the rectifiers 48 and 49 to the junction point 50, also positioned between the pick-up coils 3 and 4. A regulating resistor 51 is connected between the reference conductor 38 and a junction point 52 between the rectifiers 48 and 49.

For easy eccentricity determination, a voltmeter 53 is connected between the conductor 44 and the brush 15 and is calibrated to read the amount of eccentricity occurring by the difference of voltage between the brushes 15 and 16.

Operation of the device will now be described. If we assume that the motors 11 and 12 are being slowly driven by the reverse fields 17 and 18 in a direction capable of driving the brushes 15 and 16 in directions opposite to the arrows 54 and 55, respectively, it can be seen that the brushes 15 and 16 are constantly approaching a zero voltage differential. This zero voltage differential approached by the brushes 15 and 16 would result in an approach to non-eccentricity indication on the voltmeter 53. If we further assume that eccentricity is taking place in the shaft 5 of the rotating machine with the shaft 5 now approaching the coil 4, it can be seen that an increase in reactance of the coil 4 will occur. At the same time a decrease in reactance of the coil 3 occurs causing the points 41 and 50 to move a greater voltage distance above the conductor 2 and a closer voltage distance to the conductor 1. A higher voltage occurring at the point 41 causes current flow through the rectifier 40 and resistor 42 to the common conductor 38, since at this time the voltage at 41 is higher than the voltage at the brush 15 of the movable brush transformer 13. Current also passes from the point 41 through the rectifier 40 and rectifier 39, the control winding 29 and resistor 37 to the common conductor 38 in a path parallel to the resistor 42. Current passage through the control winding 29 of the magnetic amplifier 26 causes the magnetic amplifier 26 to conduct resulting in forward drive of the motor 11 and rapid movement of the brush 15 in the direction of the arrow 54.

The increase in voltage at the point 50 is prevented from causing current flow through the control winding 31 of the magnetic amplifier 27 by the rectifiers 49 and 48, since the voltage at point 50 is above the voltage of the brush 16. The brush 15 is driven in the direction of the arrow a distance capable of satisfying the increase in voltage occurring at the point 41 due to the eccentricity of the shaft 5. As the shaft continues rotating, however, and approaches the pick-up coil 3, the reactance of the coil 3 is increased, while the reactance of the coil 4 is decreased. This results in a lowering of the voltage at the points 41 and 50 in a direction toward the conductor 2 and away from the conductor 1. Lowering of the voltage at point 50 below the voltage at the brush 16 allows current to flow through the conductor 44, rectifier 45, and resistor 46, to the common conductor 38. At the same time current flows through the control winding 31, rectifier 48, and resistor 51 in parallel with the resistor 46 to the common conductor 38. Since the voltage on the brush 15 of the movable brush transformer 13 is higher than the voltage at the points 41 and 50, the rectifiers 36, 39 and 40 block any path of current flow from the brush 15 through the winding 29 of magnetic amplifier 26 to the junction points 41 and 50. The flow of current through the control winding 31 therefore causes the magnetic amplifier 27 to conduct and allow forward drive of the motor 12, causing the brush 16 to be driven in the direction of the arrow 55. Due to the polarity of the rectifiers 39 and 40 resulting in zero current flow through the winding 29 of the magnetic amplifier 26, this magnetic amplifier is conditioned for nonconduction blocking the forward drive of the motor 11.

It can be seen therefore that with the brush 15 being driven in the direction of the arrow 54 and the brush 16 being driven in the direction of the arrow 55, a voltage difference between the two brushes will occur. This voltage difference is the momentary amount of eccentricity occurring in the shaft 5 as it rotates between the pick-up coils 3 and 4. This results in deflection of the voltmeter 53 calibrated in eccentricity giving a direct reading of the amount of eccentricity.

If we assume as the turbine is heating up and rotating faster the eccentricity decreases, it can be seen that the voltage difference between the brush 15 and the point 41 and the brush 16 and the point 50 would become less, since the brushes 15 and 16 are constantly being driven at a slow rate toward a common voltage level. As the eccentricity decreases, the forward drive of each of the motors 11 and 12 decreases, resulting in a lower voltage differential between the brushes 15 and 16. If the eccentricity has been reduced to zero, it can be seen that the voltage at the point 41 or 50 arrives at a point midway between the lines 1 and 2, or 120 volts, and until the motor 11 drives the brush 15 to a voltage level below the 120 volt level, no forward drive of the motor 11 will take place. Likewise, with the voltage at the point 50 being 120 volts, the motor 12 will receive no forward drive until the voltage at the brush 16 rises above the 120 volt level from either conductor 1 or conductor 2, causing forward drive to occur in the motor 12. At this time the brushes of the movable brush transformers would be maintained at the same voltage level as the voltage point 41 or 50 resulting in a zero eccentricity reading on the voltmeter 53.

It is pointed out that the conductor 38 used as a reference is placed at a voltage away from the center voltage of 120 volts to provide adequate control without a dead center voltage position occurring. The difference in voltage between the reference voltage conductor 38 and the actual neutral voltage of 120 volts is compensated for by the values of the resistors 37, 42, 46 and 51.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An eccentricity determining device for a rotating member comprising, a plurality of series connected induction coils positioned substantially in opposing positions adjacent said rotating member, said induction coils being energized and effective to cause a rise and fall of the potential between said coils in response to the position of said rotating member, a pair of energized impedance members each having a variable tap, reversible motor means for slowly driving said variable taps in opposite directions, magnetic amplifier means for said motor means for reversing said motor means and causing said taps to be driven rapidly in their reverse directions, said magnetic amplifier means having control windings connected to said induction coils for selectively reversing said motor means in response to the position of said rotating member, and indicator means connected to said taps for indicating the potential difference between said taps.

2. An eccentricity determining device for a rotating member comprising, a plurality of series connected induction coils positioned substantially in opposing positions adjacent said rotating member, said induction coils being energized and effective to cause a rise and fall of the potential between said coils in response to the position of said rotating member, a pair of energized impedance members each having a variable tap, reversible motor means for slowly driving said variable taps in opposite directions, magnetic amplifier means for said motor means for reversing said motor means and causing said taps to be driven rapidly in their reverse directions, said magnetic amplifier means having control windings connected to said induction coils for selectively reversing said motor means in response to the position of said rotating member, and indicator means connected to said taps for indicating the potential difference between said taps, said motor means comprising two reversible motors one for driving each tap.

3. An eccentricity determining device for a rotating member comprising, a plurality of series connected induction coils positioned substantially in opposing positions adjacent said rotating member, said induction coils being energized and effective to cause a rise and fall of the potential between said coils in response to the position of said rotating member, a pair of energized impedance members each having a variable tap, reversible motor means for slowly driving said variable taps in opposite directions, magnetic amplifier means for said motor means for reversing said motor means and causing said taps to be driven rapidly in their reverse directions, said magnetic amplifier means having control windings connected to said induction coils for selectively reversing said motor means in response to the position of said rotating member, and indicator means connected to said taps for indicating the potential difference between said taps, said motor means comprising two reversible motors one for driving each tap, said magnetic amplifier means comprising two magnetic amplifiers with one magnetic amplifier for the control of each motor during rapid drive connections.

4. An eccentricity determining device for a rotating member comprising, a plurality of series connected induction coils positioned substantially in opposing positions adjacent said rotating member, said induction coils being energized and effective to cause a rise and fall of the potential between said coils in response to the position of said rotating member, a pair of energized impedance members each having a variable tap, reversible motor means for slowly driving said variable taps in opposite directions, magnetic amplifier means for said motor means for reversing said motor means and causing said taps to be driven rapidly in their reverse directions, said magnetic amplifier means having control windings connected to said induction coils for selectively reversing said motor means in response to the position of said rotating member, and indicator means connected to said taps for indicating the potential difference between said taps, said movable taps being slowly driven toward the same potential and rapidly driven away from the same potential, said energized impedance members being movable brush transformers.

5. An eccentricity determining device for a rotating member comprising, a plurality of series connected induction coils positioned substantially in opposing positions adjacent said rotating member, said induction coils being energized and effective to cause a rise and fall of the potential between said coils in response to the position of said rotating member, a pair of energized impedance members each having a variable tap, reversible motor means for slowly driving said variable taps in opposite directions, magnetic amplifier means for said motor means for reversing said motor means and causing said taps to be driven rapidly in their reverse directions, said magnetic amplifier means having control windings connected to said induction coils for selectively reversing said motor means in response to the position of said rotating member, and indicator means connected to said taps for indicating the potential difference between said taps, said motor means comprising two reversible motors one for driving each tap, said motor means further comprising continuously energized slow drive field means and selectively energized fast drive field means controlled by said magnetic amplifiers.

6. A circuit for response to the degree of eccentricity of a rotatable shaft relative to a neutral axis the location of which may shift in time due to gradual climbing of the shaft in its bearing with increase in its rotational speed as in warm-up of a turbine employing such shaft, said circuit comprising a pair of oppositely-arranged coil means disposed at fixed locations adjacent to the periphery of said shaft and energized to produce a shaft-position-responsive signal which varies according to variations in proximity of said shaft to said coil means due to eccentricity of said shaft during its rotation and according to variance in the location of the aforesaid neutral axis relative to the oppositely-arranged coil means; adjustable means capable of producing an output signal proportionate to the variance in the aforesaid shaft-position-responsive signal as influenced both by shaft eccentricity and by neutral axis shift; indicating means for display of said output signal; reversible motor means operable rapidly in a forward direction to effect adjustment of said adjustable means for causing an increase in said output signal substantially instantaneously with respect to corresponding increase in said shaft-position-responsive signal due to shaft rotation in the presence of eccentricity, and operable slowly in a reverse direction to effect adjustment of said adjustable means for causing a decrease in said output signal at a rate which is commensurate with an increase in said shaft-position-responsive signal due to shift in the neutral axis of said shaft when its rotational speed is increased at a prescribed rate.

References Cited in the file of this patent

UNITED STATES PATENTS 2,657,177    Rendel    Oct. 27, 1953

FOREIGN PATENTS 666,898    Great Britain    Feb. 20, 1952